Dec. 31, 1946.   H. B. MAXWELL ET AL   2,413,362
METALLIC CLIP FOR CONNECTING AND REINFORCING JOINTS IN WOOD STRUCTURES
Filed Jan. 27, 1944    2 Sheets-Sheet 1
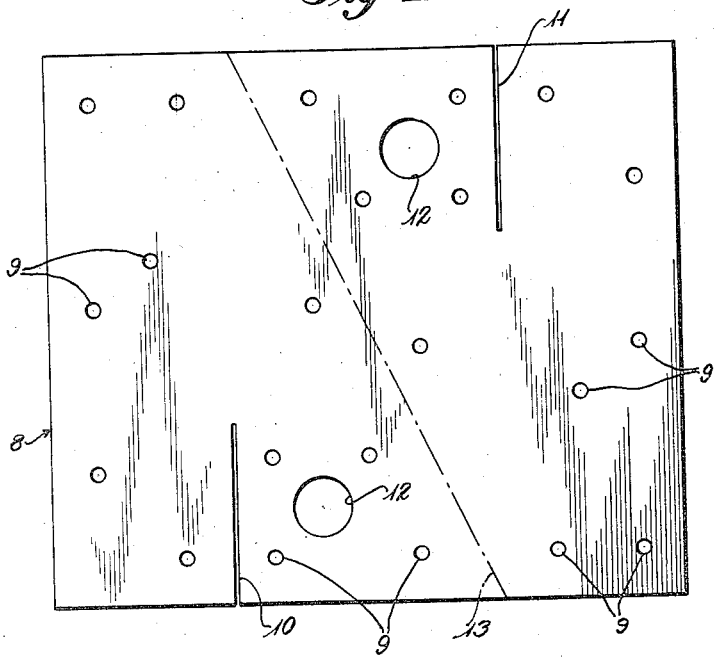
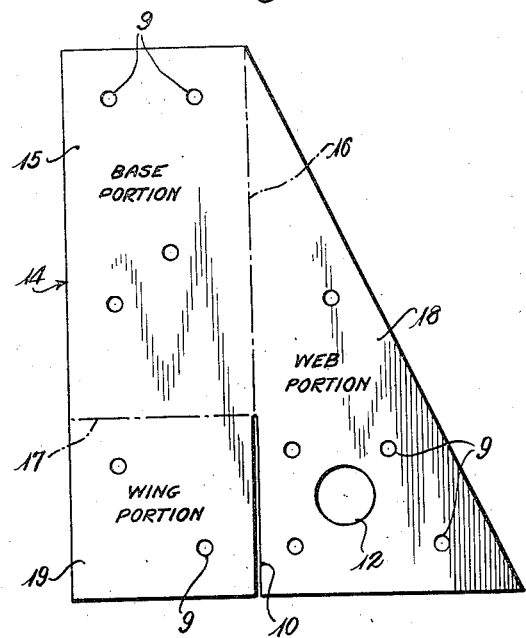
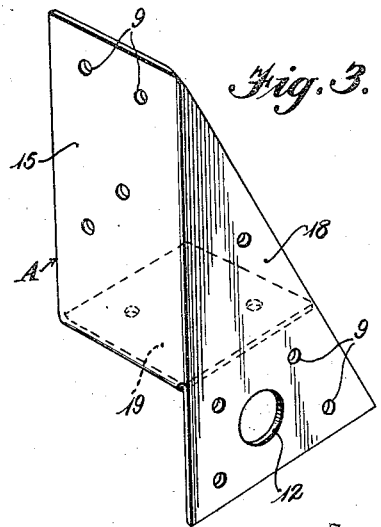
Inventors
William E. Edwards, Jr.
Homer B. Maxwell
James P. Burns
By
Attorney Dec. 31, 1946. H. B. MAXWELL ET AL 2,413,362
METALLIC CLIP FOR CONNECTING AND REINFORCING JOINTS IN WOOD STRUCTURES
Filed Jan. 27, 1944 2 Sheets-Sheet 2
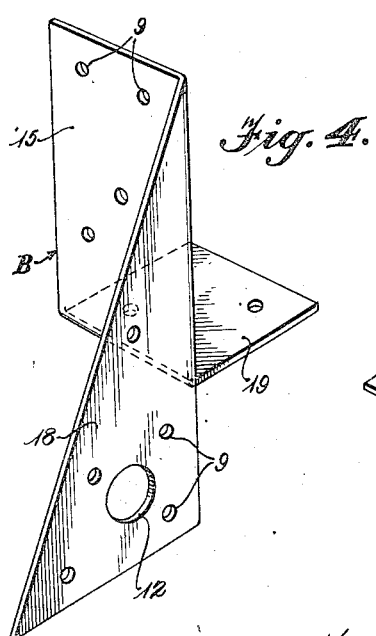
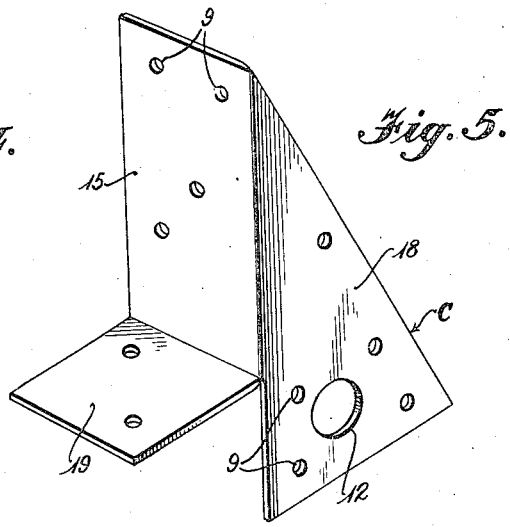
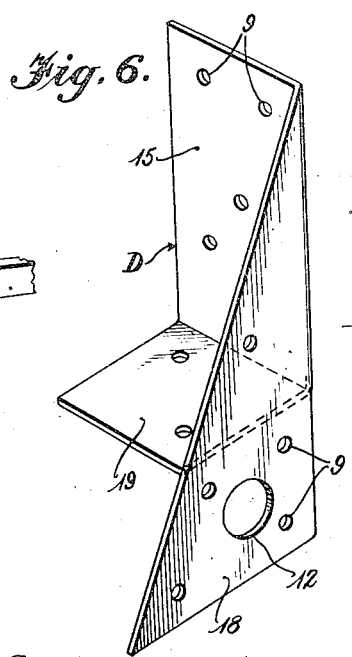
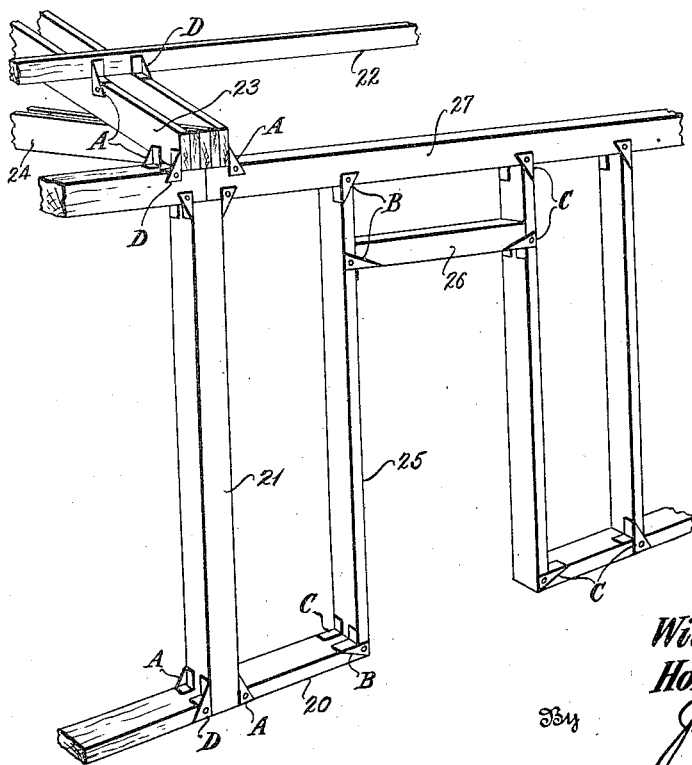
Inventors
William E. Edwards, Jr.
Homer B. Maxwell
By James P. Burns
Attorney Patented Dec. 31, 1946

2,413,362

UNITED STATES PATENT OFFICE 2,413,362

METALLIC CLIP FOR CONNECTING AND REINFORCING JOINTS IN WOOD STRUCTURES

Homer B. Maxwell, East Point, and William E. Edwards, Jr., Avondale Estates, Ga., assignors to Maxwell & Hitchcock, Atlanta, Ga., a firm composed of Homer B. Maxwell and Irving C. Hitchcock Application January 27, 1944, Serial No. 519,916

1 Claim. (Cl. 20—92)

This invention relates to metallic clips for connecting and reinforcing joints in wood structures. More particularly, it relates to metallic connectors which are intended to be placed in juxtaposition to angular joints in wood members and nailed to the members for preventing displacement of the members and for reinforcing the joints.

The clips are so constructed that portions thereof may be placed in contact with two faces of each wood member involved in the joints, the two faces lying at a right angle to each other. When the portions of the clip are nailed to these faces, advantage is taken of what might be termed interlocking nailing. Since nails are driven into each wood member from two faces, any stresses to which the clip is subjected will place nails driven into one face of the wood member in shear and the shear stresses in those nails are effective to prevent direct withdrawal of nails driven into the other face of the wood member. This arrangement causes certain of the nails to be placed in shear irrespective of the nature of the stresses applied to the joints and of the direction in which the members of the joints would tend to be displaced as a result of those stresses. Due to the utilization of interlocking nailing and the fact that certain nails are subjected to shear stresses irrespective of the type of stress in the joint, these clips are particularly effective in reinforcing joints against displacement as a result of shear and tension stresses.

An important feature of our invention resides in the angular nature of the clips which functions to resist shear stresses and affords short lever arms for the stresses introduced in to the clip by eccentricities. The clips are so constructed as to provide for the use of a maximum number of nails to thereby obtain maximum strength in the joints for the quantity of metal used in the clips. The strength of the connection between the clip and one of the members of the joints is balanced against the strength of the connection between the clip and the other member of the joints. The clips are provided with holes for receiving nails arranged in pairs to form couples to resist the internal stresses caused by the above-mentioned eccentricities. The nails forming each of the couples are arranged to afford maximum lever arms for resisting the internal stresses caused by eccentricities and the strength of the nails is thereby used to the utmost.

Another important feature of the invention is that the stresses introduced into the clips are uniformly distributed throughout the cross section of the metal and in no case do the stresses converge or concentrate at one point which would cause a point or zone of weakness.

In many wood structures there is a need for a clip which will in certain instances permit one of the wooden members to be continuous past the other wooden member with which it is jointed. In certain instances, it is necessary to have clips which can be applied to the joints after the wood members are in place. In still other instances there is a need for a connector which will lie substantially flush with all of the surfaces of the members involved in the joints. It will be apparent from the following description that a single type of connector cannot be used to satisfy all three of these needs. We have, therefore, found it necessary to provide four separate types of clips to meet these requirements. However, an important feature of our invention resides in the fact that identical blanks are used in forming all of the four types of clips, which results in a substantial saving in the cost of manufacture.

One of the primary objects of our invention is to provide metallic clips for use in connecting and reinforcing joints in wood structures which effectively prevent displacement of the wood members when the joint is subjected to either shear or tension stresses.

Another important object of the invention is to provide metallic clips for connecting and reinforcing the joints in wood structures which provide for the clips to be nailed to two faces of each wood member involved in the joint, the two faces of each wood member lying at a right angle to each other.

Another important object of the invention is to provide a plurality of different types of clips for use on joints of different characters, which may be formed from identical blanks.

A further object of the invention is to provide clips which resist shear stresses in joints by affording short lever arms for the stresses to which the clips are subjected.

Still another object of the invention is to provide clips which permit the use of a large number of nails to thereby secure maximum strength in joints with the use of a minimum of metal in the clips.

A further object of the invention is to provide the clips with openings or holes to receive the nails arranged in pairs to form couples which can effectively resist internal stresses caused by eccentricities.

Another object of the invention is to provide clips having the foregoing advantages which can be used in joints in which one of the wooden members is continuous past the place at which it is joined to another member.

A further object of the invention is to provide clips which can be arranged to lie substantially flush with the surfaces of the members involved in joints where this is necessary or desirable.

Still another important object of the invention is to provide clips having the foregoing advantages which can be applied to joints after the wood members are in position to thus permit the use of the clips for reinforcing existing wood structures as well as for connecting and reinforcing joints under construction.

Other objects and advantages of the invention will be apparent from the following detailed description taken in connection with the accompanying drawings in which:

Figure 1 is a plan view of a rectangular sheet metal plate which illustrates the manner in which two clip blanks are formed therefrom;

Figure 2 is a top plan view of a completed blank which is suitable for use in forming any one of the four types of connectors;

Figures 3, 4, 5 and 6 are perspective views of the four types of connectors which are formed from the blank shown in Figure 2; and Figure 7 is a perspective view of a portion of a wood structure which serves to illustrate exemplary uses and positioning of the various types of clips shown in Figures 3 to 6 inclusive.

Referring first to Figure 1, the reference numeral 8 designates generally a rectangular sheet of metal which is used in forming two clip blanks. A number of appropriately spaced nail holes 9 are punched in the metal sheet and the metal is severed inwardly from opposite edges thereof, as indicated by the reference numerals 10 and 11. A pair of large openings 12 are provided in the positions shown for a purpose which will be described hereinafter. The metal sheet 8 is then severed along the dot and dash line 13 to form two identical blanks, one of which is shown in Figure 2. It will be evident that the dimensions of the metal sheet 8 may be made larger and that more than two clip blanks may be formed from a single metal sheet. Nevertheless, Figure 1 serves to illustrate the manner in which a plurality of clip blanks may be made from a single metal sheet without loss of any of the metal as scrap pieces.

In the clip blank shown in Figure 2, it is convenient to designate the blank generally by the reference numeral 14 and to consider this blank as consisting of three portions. The portion 15, bounded by portions of the outer edges of the blank and the dotted lines 16 and 17, is designated as the base portion. The triangular portion 18, bounded by portions of the edges of the blank, the dotted line 16 and the line of severance of the metal 10, may be designated as the web portion. The remainder of the blank, that is the portion lying below the dotted line 17 and to the left of the line of severance 10 in Figure 2, is designated as the wing portion 19. It will be noted that the base portion 15 has a straight side edge extending along the dotted line 16 and a straight end edge extending along the dotted line 17 and that the straight end edge extends at a right angle to the straight side edge. The web portion 18 is attached to the base portion throughout the length of the straight side edge 16 and this web portion extends a substantial distance beyond that end of the base portion which is defined by the straight end edge 17. The wing portion 19 is attached to the base portion 15 along the entire length of the straight end edge 17. The base, web and wing portions are each provided with a plurality of appropriately spaced nail holes 9. The large opening 12 occupies a position near one end of the web portion 18.

In Figure 3, the reference character A designates generally one type of clip which is formed from the blank 14. In forming this type of clip, the web portion 18 of the blank 14 is bent downwardly along the dotted line 16 so that it occupies a position in a plane at a right angle to the plane of the base portion 15. The wing portion 19 is bent downwardly along the dotted line 17 so that it occupies a position in a plane lying at a right angle to the plane of the base portion 15 and also at a right angle to the plane of the web portion 18. Figure 7 clearly illustrates exemplary uses for clips of the type shown in Figure 3, these clips likewise being designated by the reference character A. It will be apparent that the clips A shown in Figure 7 can, in every instance, be applied to the wood structure after the wood members are in place. See for example the clips designated as A in the joint between the sill 20 and the lower end of the column 21. A clip of type A is also used in connecting the purlin 22 to the chord member 23 of the truss which is designated generally by the reference character 24. Attention is here called to the fact that the purlin 22 may be continuous past its connection with the chord member 23.

The clip shown in Figure 4 is designated generally by the reference character B. By comparing Figures 2 and 4, it will be seen that the wing portion 19 of the blank 14 has been bent downwardly at a right angle to the base portion 15 along the dotted line 17 and that the web portion 18 has been bent upwardly at a right angle to the base portion 15 along the dotted line 16. Exemplary uses for the clip B are illustrated in Figure 7 in which the clips of this type are likewise designated by the reference character B. See for example the clip B at the joint between the sill 20 and the lower end of the rough buck 25. Clips of this type are also used in joining the rough buck 25 to the lintel 26 and to the girder 27. As is best illustrated by the clip B which is used at the joint between the lintel 26 and the rough buck 25, all parts of the clip lie substantially flush with the surfaces of the members involved in the joint and there is no projection of the clip to obstruct clear openings. It will be evident that if the clip shown in Figure 3 were used in this joint, the web portion 18 of the clip A would project inwardly and downwardly from the surfaces of the lintel and the rough buck and would, therefore, constitute obstructions.

It is advisable to here point out that clips B might be used in any of the positions illustrated in Figure 7 in which clips A are shown in use. However, if such a substitution were made, the clips B would have to be added at the time the wood members were positioned. This will be evident from a consideration of the joint between the purlin 22 and the chord member 23. If a clip of the type designated by the reference character B were substituted for the clip A in this joint, the purlin 22 would necessarily have to rest on the wing portion 19 of the clip B and this would render it difficult or impossible to add a clip B to the joint after the wood members were in position.

In Figure 5, the reference character C designates generally the third type of clip which may be formed from the blank 14. By comparing Figures 2 and 5, it will be seen that the web portion 18 has been bent downwardly along the dotted line 16 at a right angle to the base portion 15 and that the wing portion 19 has been bent upwardly along the dotted line 17 so that it lies at a right angle to the base portion 15. Clips of this type are shown in use in the structure illustrated in Figure 7 and are designated by the reference character C. It is evident from the foregoing that clips C have their applications in positions opposite in hand to the positions in which clips B are used.

The fourth type of clip which may be formed from the blank 14 is designated by the reference character D in Figure 6. A comparison of Figures 2 and 6 reveals that in clip D the web portion 18 has been bent upwardly along the dotted line 16 so that it occupies a position at a right angle to the base portion 15 and the wing portion 19 has likewise been bent upwardly along the dotted line 17 so that it occupies a position at a right angle to base portion 15. Exemplary uses for clips D are illustrated in Figure 7. It is pointed out that clips D are used in positions opposite in hand to the positions in which clips A are used.

In all of the clips illustrated in Figures 3 to 6, each of the base, the web and the wing portions lie in separate planes which are mutually perpendicular to each other. It is possible merely by selecting the proper type of clip to nail the clip to two faces of each of two wood members involved in a joint. The two faces of each wood member lie at a right angle to each other and the principles of interlocking nailing are thus utilized with the advantages discussed above. It is true that in instances where one of the members involved in the joint is continuous past the joint it is not possible to utilize the principle of interlocking nailing on one of the members by the use of a single clip. As a practical matter, this is of little consequence since the clips are used in multiple and by using clips either directly opposite each other or in diagonally opposite positions the principles of interlocking nailing are secured with its attendant advantages. An example of such an instance is illustrated in Figure 7 in connecting truss 24 to girder 27. Clip A is used opposite clip D and interlocking nailing is accomplished.

The large opening 12 in the web portion 18 of each of the clips is for the purpose of permitting nails to be driven through the clip in attaching veneer, siding, or the like to the structure in which the clips are used. In nailing veneer or siding to such a structure, it is frequently necessary or desirable to use nails in positions directly over the clips. The openings 12 have diameters sufficiently large so that it is a simple matter to so position nails in the veneer or siding that they will pass through these openings.

The clips are preferably made from 16 to 20 gauge sheet metal. The manner in which the various portions of the clips are offset from each other contributes to the rigidity of the clips and greatly increases the strength of the joints with which the clips are used.

Having thus described our invention, what we claim is:

A metallic clip for connecting and reenforcing joints in wood structures comprising a unitary sheet metal body member consisting of a rectangular base portion, a rectangular wing portion and a web portion in the form of a right triangle with the longer of the sides adjacent the right angle being equal in length to the combined lengths of the base and wing portions, said portions lying in planes which are mutually perpendicular to each other, the above mentioned longer side of said web portion being joined to said base portion along a side edge of said base portion and projecting beyond one end edge only of said base portion, said wing portion being joined to said base portion along said one end edge of said base portion, and said wing portion intersecting but being free from attachment to said web portion along a line extending across said web portion intermediate the ends of its above mentioned longer side, there being a plurality of apertures in each of said base wing and web portions to receive attachment fasteners engageable with adjacent wood structures.

HOMER B. MAXWELL.
WILLIAM E. EDWARDS, Jr.